Nov. 9, 1943.  E. W. ECKEY  2,333,712
FRACTIONAL DISTILLATION
Filed Aug. 27, 1940
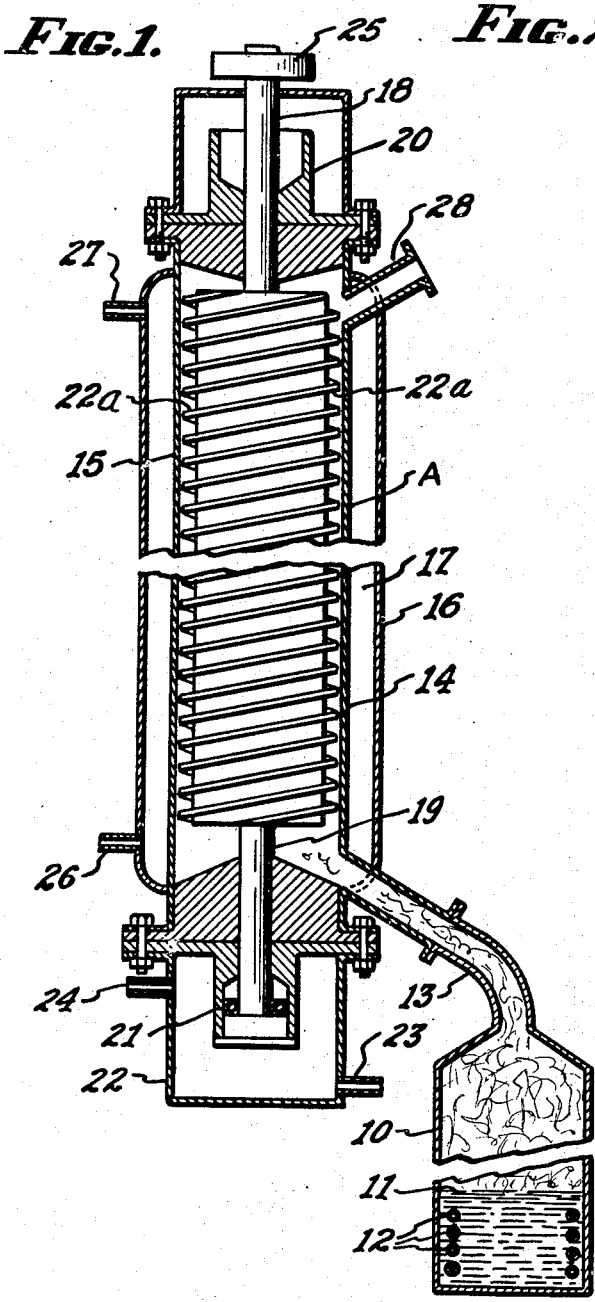
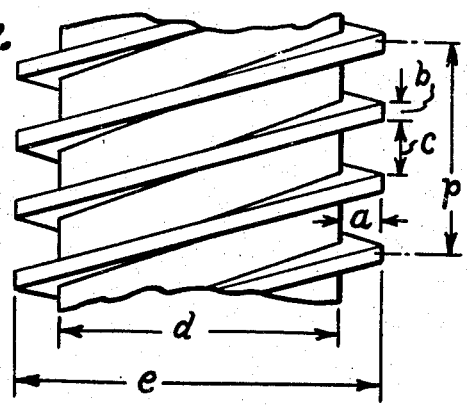
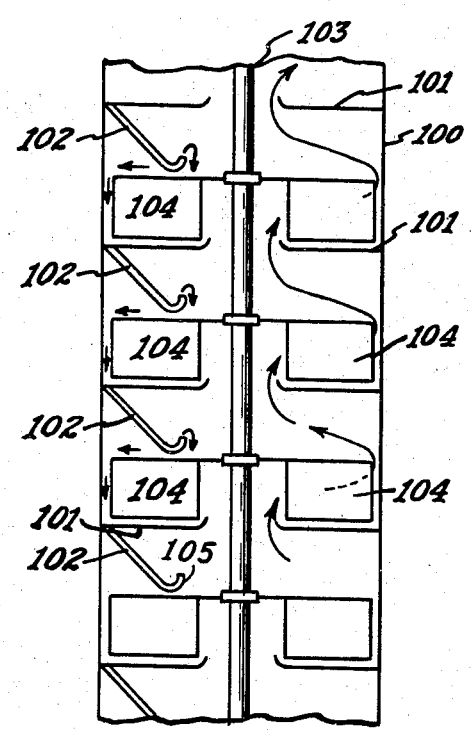
INVENTOR.
EDDY W. ECKEY.
BY
Allen & Allen
ATTORNEYS.

Patented Nov. 9, 1943

2,333,712

UNITED STATES PATENT OFFICE 2,333,712

FRACTIONAL DISTILLATION

Eddy W. Eckey, Wyoming, Ohio, assignor to The Procter & Gamble Company, Cincinnati, Ohio, a corporation of Ohio Application August 27, 1940, Serial No. 354,428

10 Claims. (Cl. 202—153)

This invention relates primarily to the art of fractional distillation.

The primary object of my invention is to provide an efficient apparatus and process for the fractional distillation of a mixture of liquids having different boiling points.

The conventional fractionating column, which is a convenient device for carrying out a series of successive partial distillations and condensations, ordinarily termed fractional distillation, operates at substantially constant pressure. However, as pointed out below, a pressure difference may exist in such columns, the higher pressure being at the bottom of the device. When the column is in operation, condensate descends by gravity counter current to ascending vapors, the vapor and liquid being in more or less intimate contact with each other throughout.

Samples of liquid taken at successively higher points in the fractionating column will show successively higher concentrations of the more volatile constituent of the mixture being distilled and temperatures taken at the same points will be successively lower corresponding with the successively lower boiling points resulting from the presence of successively greater concentrations of more volatile constituent.

The pressure at any point within the column depends primarily on the operating pressure but also depends on its design, the type and amount of packing if the same is employed, and the rate at which the column is operated. This pressure is practically always appreciably lower at the top than at the bottom of the column and this difference in pressure represents the pressure required to force the vapors upward against the descending stream of liquid thereby tending to oppose high fractionating efficiency. Ordinarily the pressure difference is kept as small as factors involved in column design will permit. Such fractional distillation, in spite of the existence of any such pressure differential, can be termed "temperature gradient" fractionation because fractionation is dependent primarily on the difference in the boiling point temperature of the various fractions.

It is also possible to fractionate a mixture of liquids having constituents of different boiling points by operating under a pressure gradient as distinguished from a temperature gradient and at a substantially constant temperature throughout the fractionating column and thereby avoid the disadvantages attending temperature gradient operation. In such a system the more volatile fractions would be obtained from the higher pressure zones and the less volatile fractions would be obtained from the lower pressure zones, a condition contributing several advantages as more fully hereinafter set forth.

In accordance with my invention, outstanding precise fractionation may be obtained in both continuous fractional distillation, wherein the feed in vapor or liquid form is continuously introduced at some point in the apparatus, the light and heavy fractions being continuously withdrawn, and in batch fractional distillation wherein the vapors from a batch still are passed through a fractionating apparatus. While the present invention will be described primarily as applied to batch fractional distillation, it will be understood that by the application of rules, principles and basic laws well known to those versed in the art, the invention can be applied with equal facility and success to continuous fractional distillation.

The above mentioned object and aspects of my invention as well as the various features of a preferred embodiment thereof will be understood from the following detailed description, reference being had to the accompanying drawing in which Figure 1 is a general view, diagrammatic in parts, illustrating a fractionating column constructed in accordance with my invention and adapted to operate in conjunction with a batch still;

Figure 2 is an enlarged view of the grooved rotor of Figure 1; and

Figure 3 is a diagrammatic drawing of a section of another type of fractionating column coming within the scope of my invention.

Referring first to Figure 1 showing a preferred embodiment of the invention, a still 10 is provided in which a mixture of liquids 11 having different boiling points is boiled by the application of heat through a suitable heating element such as a heating coil 12. The vapor passes through vapor pipe 13 and into the fractionating column indicated generally at A.

The fractionating column comprises two essential parts: the casing 14 and the rotor 15. The casing in the present instance is cylindrical in shape and a cross section of same should be as near a perfect circle as possible so as to permit free rotation of the rotor therein with substantially uniform small clearance as more fully hereinafter described. To avoid undue condensation within the fractionating column and loss of heat, a jacket 16 may surround the casing 14 thereby forming a jacket space 17 through which a temperature controlling liquid may be circulated, suitable inlet and outlet means 26 and 27 being provided.

The rotor 15 comprises upper and lower shaft extensions 18 and 19 respectively. These shaft extensions provide bearing surface for the upper and lower bearings 20 and 21 respectively which may be cooled by the circulation of a suitable cooling medium through a jacket 22 provided with inlet 23 and outlet 24 as shown for example in connection with bearing 21. The main body of the rotor 15 is cylindrical in shape, fits within the casing 14 with suitable clearance and is provided with a continuous groove 22$^a$. When rotated by a source of power (not shown) through pulley 25 it resembles a screw conveyor or the auger in a meat chopper or soap plodder in its action and forces vapors from the bottom to the top of the fractionating column, the continuous groove, of course, acting as the passageway. The efficiency of the equipment generally, and more specifically the pressure differential built up, is dependent on the amount and uniformity of clearance between the inside wall of the casing 14 and the rotor. Consequently it is essential that the rotor and casing be concentric and that the amount of clearance be carefully worked out, taking into consideration speed of rotation of the rotor, type of material being distilled, thickness of film of refluxed material, etc., so that slippage of vapor between the rotor and the casing wall is maintained at a minimum.

In Figure 2 I have shown an enlarged view of the grooved rotor of Figure 1 which is provided with a triple right hand groove for example. In this figure various dimensions are indicated by letter:

$a$ represents the depth of groove;
$b$ represents width of the land;
$c$ represents the width of the groove;
$p$ represents the pitch of the groove;
$d$ represents the root diameter of the rotor, and
$e$ represents the outside diameter of the rotor.

In operation the vapors formed in the still 10 pass through the vapor pipe 13 and are picked up by the groove on the rotating rotor 15. As the vapors are forced upwardly in the column by operation of the rotor they are gradually compressed and fractionation occurs due to the gradual increase in pressure as the vapors approach the upper end of the rotor 15. It may be desirable to assist in maintaining the fractionating column at a substantially constant temperature in which case a temperature controlling means may be circulated through the jacket space 17. Vapors existing at the top of the fractionating column are drawn off through vapor pipe 28 to suitable condensing equipment not shown.

As the vapors ascend the fractionating column and are subjected to gradual increase in pressure, a certain amount of condensation takes place and this condensate will flow downwardly in a film on the inner wall of the casing 14 coming in intimate contact with the vapors in the groove. After the column has been in operation for some time, an equilibrium will be set up as is the case in any ordinary type of fractionating column, and vapor will tend to be in equilibrium with the liquid condensate at any given point throughout the column.

As stated above the difference in pressure between the top and the bottom of the fractionating column will depend wholly on the design and operation of the rotor and the clearance between the rotor and the inner wall of the casing 14 and these conditions will be more thoroughly understood from the following example.

*Example.*—Dimensions of essential parts of a working unit constructed in accordance with the above description are as follows:

|  | Inches |
|---|---|
| Inside diameter of casing | 3.000 |
| Outside diameter of rotor | 2.980 |
| Clearance | .010 |
| Length of grooved portion of rotor | 24.00 |
| Root diameter of rotor | 2.48 |
| Depth of groove (triple right hand groove employed) | .25 |
| Width of groove at top | 7/32 |
| Width of groove at bottom, slightly less than | 7/32 |
| Lands between grooves | 1/8 |
| Pitch of groove | 17/32 |

Bearing shaft extensions, bearings, and packing glands around the rotor shafts are constructed in any suitable manner to suit the particular use to which the column is put. For instance; bearing and gland construction will depend on whether the column is to be operated at a greater than atmospheric or less than atmospheric pressure, and suitable means of construction which are well known to those versed in the art and constitute no essential part of the present invention may be used.

I have operated a column so constructed in the distillation of a test mixture of carbon tetrachloride and benzene in which the concentrations were such that the mol fraction of carbon tetrachloride at the beginning of the distillation was .225. With the rotor rotating at 4950 R. P. M. and the pressure at the top of the column one atmosphere, the pressure at the bottom of the column was less than that at the top of the column by 27 millimeters of mercury. This pressure difference remained nearly the same at rates of distillation that caused reflux from the condenser at the top of the column varying from 1 to more than 20 grams per minute. Vapor temperature at the outlet of the column was 77° C and at the inlet less than 1° higher but this inlet temperature was about 1° lower than the boiling point of the liquid in the still measured at the pressure existing at the outlet of the column.

At a rate of reflux of about 14 grams per minute, a small sample of distillate withdrawn at a rate about 1/10 of the rate of reflux from the condenser was found to contain .735 mol fraction of carbon tetrachloride when analyzed by refractive index.

The separation obtained corresponds with a calculated number of "theoretical plates" of about 21 based on infinite reflux. Similar values were obtained in distillations starting with different proportions of the two constituents. Since this column has a working length of 24 inches, the calculated "height per theoretical plate" in these distillations was slightly more than 1 inch, or less than 1½ times the pitch of the groove on the rotor.

In Figure 3 is shown another arrangement whereby the necessary pressure difference for operation of a fractionating column in accordance with the present invention may be obtained. This drawing is diagrammatic and shows a casing 100 containing at spaced intervals liquid condensate plates 101 with overflow pipes 102 adapted to conduct liquid from one plate to the next lower plate. A shaft 103 operating in suitable end bearings, not shown, contains thereon a series of impellers 104 of suitable design so that when the shaft 103 is rotated, each impeller draws vapor from the next lower compartment and forces it outward toward the column wall 100. As is shown, the impellers are separated by the plates 101 with close clearance on the lower side of the impeller to minimize leakage of vapor down the column.

In operation the refluxing liquid runs down the column wall where it intimately contacts vapors discharged by the impellers toward the wall 100. The liquid collects on the plates and flows down through a trap 105 provided at the lower end of the overflow pipes 102 and discharges on the topside of the next lower impeller which, due to its rotating action, sprays the liquid outwardly against the wall 100.

The vapors are thus pumped upward through the column counter current to the flow of the liquid. Suitable connections at the top and bottom for receiving the fractions should, of course, be provided.

It will be obvious from the description that the instant method of fractional distillation is operated so as to combine with the column structure the appropriate moving elements that will force the vapors from the bottom to the top of the column through a series of zones having successively higher pressures. In other words, the fractionating column operates as a combined countercurrent column and a multi-stage vapor compressor.

If desired, it is possible to operate fractionating devices of my invention so that there exist not only pressure gradient but also temperature gradient conditions within the apparatus, the temperature gradient being the reverse of that ordinarily occurring in the conventional fractionating column in that the temperature of the vapor being withdrawn for condensation is higher than the temperature of the vapors entering the device. This condition can be brought about by operating so that the gradual increase in pressure and consequent condensation of vapor is sufficient to raise the temperature of uncondensed vapor which, by virtue of its higher temperature, may be employed in a suitable manner to preheat the incoming material being subjected to fractional distillation.

The more desirable types of vapor pumps to use in the construction of an apparatus suitable for my process are those having rotating elements as described above rather than reciprocating elements. In addition to those vapor pumps or blowers specifically given above, there may be mentioned the ordinary fan type with rotating propellers, an electric fan being a familiar example. This type is ordinarily employed to move large volumes of gas against a low head. A rotary type, as may be exemplified by the ordinary type of gear pump or any of its modifications, may likewise be employed. While I prefer to use a series of elements which rotate and thereby bring about a non-pulsating pressure gradient, a reciprocating mechanism in which a series of diaphragm or piston pumps is used may also be employed in the practice of this invention.

In the foregoing description, I have shown my invention as applied to an upright column type fractionating apparatus. However, I wish it understood that the form which the apparatus may be given is not a limitation of my invention. For example, the apparatus may comprise a horizontal disc with a spiral groove adapted to rotate with close clearance near a stationary disc, so as to pump vapor toward the center of the disc while the liquid, due to centrifugal force, is thrown outward toward the edge of the disc. Other designs may be employed.

A fractionating apparatus constructed in accordance with my invention will have very distinct advantages over the conventional type of fractionating device, the more important of them being mentioned below.

The control of temperature in a fractionating apparatus is important and has to be provided for if precise fractionation is to be obtained. Conventional types of equipment have been jacketed to provide for uniform temperature gradient control and loss of heat. One advantage of a fractionating apparatus such as that herein covered is that it operates at a pressure gradient, thus making possible the use of a uniform temperature throughout. Such an advantage is obvious since a simple jacket with a heating fluid circulating therethrough can be employed to provide temperature control to the desired degree of precision.

In the distillation of materials that require high vacuum because of low volatility or sensitiveness to heat, the type of fractionating apparatus herein covered is particularly adaptable. With a conventional packed column, or plate and cap column, and a vacuum system capable of maintaining the pressure at the top of the column at one millimeter, the pressure at the bottom of the column will be considerably greater, anywhere from, for example, two millimeters to many times the pressure at the top. In order to overcome this counteracting pressure in batch fractional distillation for example, it is necessary to increase the vapor pressure in the still, which may require the use of undesirably high temperatures. In the type of apparatus which I propose, the vapors are forced upwardly so that the pressure at the top of the apparatus is greater than at the bottom, thus making such increased temperatures in the still pot unnecessary. In fact in my invention pressures are lowest in the still thus favoring flow of reflux liquid toward same. Of course, similar advantages will be noted when the apparatus is employed in conjunction with continuous fractional distillation.

Furthermore, it is known that entrainment, an ever present worry in distillation operations including those employing fractionating columns, is affected materially by vapor velocities and that in ordinary operations velocities above 5 or 6 feet per second are prohibitive in most instances. With the present invention in use wherein rotating elements are employed for compressing the gas, vapor velocities may be materially increased without excessive entrainment of liquid, thus making possible higher capacities for any given size of apparatus.

The field for the pressure gradient type of fractionating column would include distillation of materials too volatile to distill in a so-called "molecular still" and yet not volatile enough to distill quite satisfactorily in columns at present available. Higher fatty acids and alcohols, monoglycerides, lubricating oils and other petroleum derivatives would fall in this category.

Highly volatile mixtures or mixtures containing a volatile fraction might also be distilled in the instant type of fractionating column to advantage. In instances where the volatile fraction is difficult to condense at atmospheric pressure, the column could be run with the heavy fraction taken off at atmospheric pressure and with the more volatile fraction removed at considerably higher pressure. Rectification of volatile gasolines or separation of light gasoline from natural gas might be included in such uses of the pressure gradient fractionating column.

While the fractionating apparatus of my invention will find its greatest use in the field of distillation, actually it may be employed in a number of related fields wherein liquid and vapor move countercurrently in contact with each other and the separation of constituents is dependent on difference in boiling points or difference in solubility of gas in a liquid at different pressures. Thus, for example, the apparatus may be employed as a stripping column or as a column for use in gas scrubbing.

Having thus described my invention, what I claim and desire to secure by Letters Patent is:

1. A fractionating column adapted to fractionate vapors evolved in boiling a mixture of ingredients having different boiling points, comprising a casing, a rotor adapted to revolve within said casing, and a helical groove in the wall of said rotor adapted to carry vapors under gradually increasing pressure to the outlet of said column, the clearance between said rotor wall and said casing being sufficiently small to avoid serious vapor slippage.

2. In combination with a still, a liquid and vapor contact device adapted to fractionate vapors evolved in boiling a mixture of ingredients having different boiling points comprising a casing, a rotatable shaft in said casing, a helical passageway on said shaft adapted to force vapors during rotation from the inlet to the outlet of said column, the said outlet being at higher pressure than the said inlet, and the clearance between said casing and the outside diameter of said shaft being sufficiently small to avoid serious vapor slippage.

3. A pressure gradient liquid and vapor contact device adapted to fractionate vapors evolved in boiling a mixture of ingredients having different boiling points, comprising a casing, a rotatable shaft in said casing and a helical passageway on said shaft adapted to force vapors during rotation under progressively increasing pressure to the outlet of said fractionating device, the clearance between said casing and the greatest diameter of said shaft being sufficiently great to permit the return of refluxing condensed vapors but sufficiently small to avoid serious vapor slippage.

4. In a still for selectively condensing a desired ingredient from a mixed vapor, a casing, an inlet for the introduction of mixed vapor into said casing and a rotatable, flow-inducing, pressure-developing mechanism within said casing providing free passage for vapor without obstruction to flow by refluxing condensate and adapted to progressively increase the pressure on said vapors non-pulsatively as they pass through said casing whereby a pressure is obtained on the mixed vapors which results in condensation of desired ingredient, the clearance between said casing and said rotatable mechanism being sufficiently small to avoid serious vapor slippage.

5. A pressure gradient fractionating device adapted to fractionate vapors evolved in boiling a mixture of ingredients having different boiling points, comprising a vertical casing, a close fitting but freely movable rotor in said casing, and a helical passageway on said rotor adapted to pump vapors under progressively increasing pressure to the outlet of said device, the clearance between said rotor and said casing being sufficiently great to permit the return of refluxing condensed vapors, but sufficiently small to avoid serious vapor slippage.

6. In a still for selectively condensing a desired ingredient from a mixed vapor, a casing, means for causing a flow of said mixed vapor into the casing and a rotor in said casing having a helical groove thereon adapted to provide free passage for vapor without obstruction by refluxing condensate, and to force said vapors toward the outlet of said casing under progressively increasing pressure, the clearance between said rotor and said casing being sufficiently great to permit the return of refluxing condensed vapors but sufficiently small to avoid serious vapor slippage.

7. A pressure gradient constant temperature fractionating device adapted to fractionate vapors evolved in boiling a mixture of ingredients having different boiling points, comprising a casing, a rotatable shaft in said casing, a helical passageway on said shaft adapted to carry vapors under progressively increasing pressure to the outlet of said device and means for maintaining the said casing and the contents thereof at a substantially constant temperature, the clearance between said shaft and said casing being sufficiently small to avoid serious vapor slippage.

8. A pressure gradient constant temperature fractionating device adapted to fractionate vapors evolved in boiling a mixture of ingredients having different boiling points, comprising a casing, a rotatable shaft in said casing, a helical passageway on said shaft adapted to carry vapors under progressively increasing pressure to the outlet of said device and a temperature controlling jacket for said casing, the clearance between said shaft and said casing being sufficiently small to avoid serious vapor slippage.

9. A pressure gradient liquid and vapor contact device adapted to fractionate vapors evolved in boiling a mixture of ingredients having different boiling points, comprising a casing, a rotor in said casing, and a vapor passageway on said rotor leading from the inlet to the outlet of said device and adapted to pump vapors under progressively increasing pressure to said outlet when said rotor is rapidly rotated, the clearance between said rotor and said casing being sufficiently small to avoid serious vapor slippage.

10. In combination with a still, a pressure gradient liquid and vapor contact device adapted to fractionate vapors evolved in boiling a mixture of ingredients having different boiling points, comprising a casing, a rotor in said casing, a vapor passageway on said rotor to provide free passage of vapors and adapted to pump vapors non-pulsatively under progressively increasing pressure, to the outlet of said device when said rotor is rapidly rotated, and means for rotating said rotor, the clearance between said rotor and said casing being sufficiently great to permit the return of refluxing liquid on said casing wall, but sufficiently small to avoid serious vapor slippage.

EDDY W. ECKEY.

CERTIFICATE OF CORRECTION.

Patent No. 2,333,712.   November 9, 1943.

EDDY W. ECKEY.

It is hereby certified that error appears in the printed specification of the above numbered patent requiring correction as follows: Page 3, second column, line 7-8, for "acacordance" read --accordance--; page 4, first column, line 29, strike out "sufficiently small to avoid"; and insert instead --at least 0.01 inch but not so great as to permit--; line 41, strike out "se-"; line 43, for "gradiant" read --gradient--; lines 42 and 69, and second column, lines 34, 45, and 56, after the word "slippage" and before the period insert --but sufficiently great to permit the return of refluxing condensed vapors--; and that the said Letters Patent should be read with this correction therein that the same may conform to the record of the case in the Patent Office.

Signed and sealed this 1st day of February, A. D. 1944.

(Seal)

Henry Van Arsdale,
Acting Commissioner of Patents.